(12) United States Patent
Gleeson et al.

(10) Patent No.: US 6,978,680 B2
(45) Date of Patent: Dec. 27, 2005

(54) DYNAMIC PRESSURE PROBE HOLDER AND METHOD OF OBTAINING A DYNAMIC PRESSURE SIGNAL

(75) Inventors: Eamon P. Gleeson, Atlanta, GA (US); Walter John Smith, Baliston Spa, NY (US); Robert John Naumiec, Clifton Park, NY (US); Fei Han, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 250 days.

(21) Appl. No.: 10/374,719

(22) Filed: Feb. 27, 2003

(65) Prior Publication Data

US 2004/0168520 A1 Sep. 2, 2004

(51) Int. Cl.[7] .................................................. G01L 7/00
(52) U.S. Cl. .......................................... 73/756; 73/1.71
(58) Field of Search ........................... 73/700–756, 1.71

(56) References Cited

U.S. PATENT DOCUMENTS

| | | | |
|---|---|---|---|
| 3,943,759 A | 3/1976 | Kato et al. | |
| 4,487,213 A | * 12/1984 | Gates et al. | 137/2 |
| 4,557,106 A | 12/1985 | Flowes Williams et al. | |
| 5,706,643 A | 1/1998 | Synder et al. | |
| 5,987,981 A | * 11/1999 | Boer | 73/202.5 |
| 6,135,760 A | 10/2000 | Cusack et al. | |
| 6,446,504 B1 | * 9/2002 | Maginnis, Jr. | 73/204.27 |
| 6,708,568 B2 | 3/2004 | Gleeson | |

FOREIGN PATENT DOCUMENTS

| | | |
|---|---|---|
| EP | 1211498 | 6/2002 |
| EP | 1288642 | 3/2003 |

OTHER PUBLICATIONS

U.S. application Ser. No. 09/989,102, filed Nov. 21, 2001 of GLEESON.
U.S. application Ser. No. 10/374,730, filed Feb. 27, 2003 of GLEESON.

* cited by examiner

*Primary Examiner*—William Oen
*Assistant Examiner*—Jermaine Jenkins
(74) *Attorney, Agent, or Firm*—Nixon & Vanderhye PC

(57) ABSTRACT

A component adapted to transmit a dynamic pressure signal from a high temperature environment to a location where it can be measured without causing significant attenuation of the signal. In particular, the component provides for a dynamic pressure signal transmission in the manner that will not result in the formation of condensation in the measurement system and thus eliminates the need to periodically purge condensate from the system.

28 Claims, 4 Drawing Sheets ly located dynamic pressure sensor. The long length of the metal tubing from the combustion chamber to the remotely located sensor results in significant attenuation of the pressure signal, so that it is not possible to measure the true dynamic pressure of the combustion system. In these systems, several factors affect the degree of signal attenuation, including, the internal diameter of the tubing; the length of the tubing; the temperature profile within the tubing; the static pressure within the tubing; and the frequency content of dynamic pressure signature. In some systems, a damping coil wound around an axis is used to prevent the formation of standing waves in the measurement system. This type of system results, however, in the formation of condensate in the wound damping coil. Condensation build up in the coils results in standing waves being formed in the tubing which attenuates the true source signal and prevents it from being measured accurately.

DYNAMIC PRESSURE PROBE HOLDER AND METHOD OF OBTAINING A DYNAMIC PRESSURE SIGNAL

BACKGROUND OF THE INVENTION

This invention relates to a device and a method for measuring the dynamic pressure of a combustion chamber of, for example, a gas turbine machine.

As part of the monitoring controls and diagnostic tools for an operating combustion system in a rotary machine such as a gas turbine, it is necessary to measure and acquire various data including combustion chamber dynamic pressure. This data is used to confirm proper operational health of the combustion system, and is also used to tune the gas turbine engine so that it is operating with an appropriate balance between combustion dynamics and emissions. Measuring dynamic pressure directly in a combustion chamber requires a sensor that functions in operating environments having temperatures in the range of 2000–3000° F. Currently, existing dynamic pressure probes are designed to withstand no more than about 1000° F. As a result, existing combustion dynamic pressure measurement methods do not utilize sensors located directly on the combustion chamber. Rather, current systems use metal tubing called wave guides to transmit the pressure signal from the combustion chamber to a remotely located dynamic pressure sensor. The long length of the metal tubing from the combustion chamber to the remotely located sensor results in significant attenuation of the pressure signal, so that it is not possible to measure the true dynamic pressure of the combustion system. In these systems, several factors affect the degree of signal attenuation, including, the internal diameter of the tubing; the length of the tubing; the temperature profile within the tubing; the static pressure within the tubing; and the frequency content of dynamic pressure signature. In some systems, a damping coil wound around an axis is used to prevent the formation of standing waves in the measurement system. This type of system results, however, in the formation of condensate in the wound damping coil. Condensation build up in the coils results in standing waves being formed in the tubing which attenuates the true source signal and prevents it from being measured accurately.

Thus, in order for an acoustic damping system to work continuously, the formation of condensation in a coil system must be prevented. To address this issue, conventional systems must be periodically purged to remove the condensate from the damping coils.

BRIEF DESCRIPTION OF THE INVENTION

Rather than periodically purging condensate in the coil system at least one mechanism is provided to prevent condensation formation in the acoustic damping system. According to an embodiment of the invention, it is ensured that the temperature inside the damping coil(s) is high enough to prevent condensation. This may be achieved by providing a dedicated heat source close to the damping system to maintain an elevated temperature or by locating the acoustic damping system in a location that is sufficiently hot so as to prevent condensation, whereby an additional heat source is not required.

In an embodiment of the invention, the dynamic pressure signal is transmitted from the high temperature environment, such as the inside of a combustion chamber, via a wave guide to a damping coil that is wound around a horizontal axis of the sensor holder. In this example, the coil comprising the acoustic damping system is wound around the pressure sensor holder in a heat exchange configuration whereby the heat of the media disposed in the wave guide is conducted to the damping coil by convection.

Thus, the invention may be embodied in a dynamic pressure probe holder for a combustor comprising: a holder body having a pressure sensing passage and housing a pressure sensor operatively coupled to said pressure sensing passage; and an elongated acoustic damping coil coupled to so as to be in flow communication with said pressure sensing passage, said damping coil being disposed in heat exchange relation to a heat source so as to substantially avoid condensation formation in said coil.

The invention may also be embodied in a dynamic pressure probe holder for a combustor comprising: a holder body having a pressure sensing passage and defining a pressure sensor chamber operatively coupled to said pressure sensing passage; and an elongated acoustic damping coil having a bore operatively coupled to said pressure sensing passage, said damping coil being wound about said holder body so as to be disposed in heat exchange relation thereto so as to substantially avoid condensation formation in said coil.

Additionally the invention may be embodied in a method of obtaining a dynamic pressure signal from a combustor while preventing the formation of condensation, comprising: providing a dynamic pressure probe device comprising a holder body having a pressure sensing passage and housing a pressure sensor operatively coupled to said pressure sensing passage; and an elongated damping coil coupled to said pressure sensing passage, said damping coil being disposed in heat exchange relation to a heat source; supplying a dynamic pressure signal from the combustor through said pressure sensing passage; detecting said dynamic pressure signal with said pressure sensor; and transmitting said pressure signal downstream from said pressure sensor to a signal damping mechanism comprising said coil; whereby heat from said heat source prevents the formation of condensation in said coil.

In addition, or in the alternative; passive continuous purging with hot air is provided to prevent condensation in the damping coil. According to this embodiment, one end of the wound-damping coil is coupled to the wave guide via an attenuation line and the other end of the wound-damping coil is connected to a source of hot air via a purge coil.

According to one embodiment, the source of hot air is compressor discharge and, provides a continuous gentle purge of the system.

DETAILED DESCRIPTION OF THE INVENTION

Figure 1:
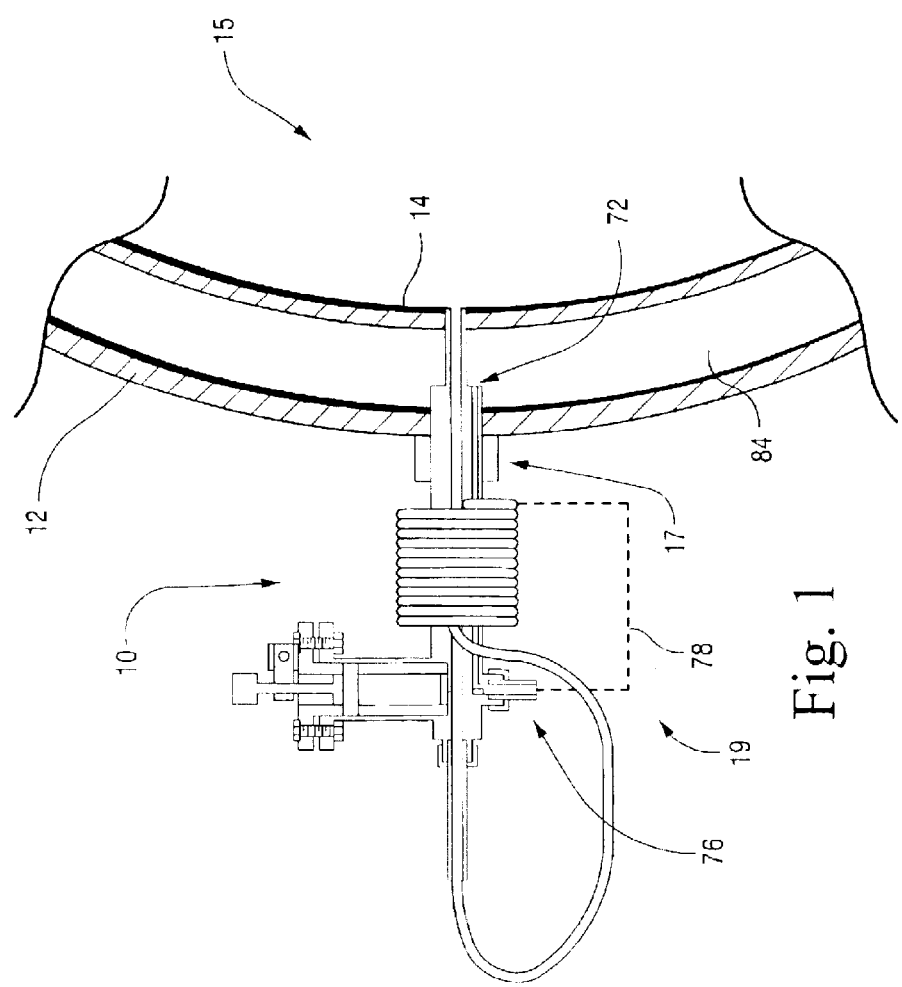
FIG. 1 is a schematic view, partly in cross-section taken through a combustor, illustrating a dynamic pressure sensor mounted to the outer combustor wall by means of a pressure sensor holder in accordance with an exemplary embodiment of the invention.

With reference to FIG. 1, a probe holder 10 embodying the invention is schematically shown attached to the outer wall or casing 12 of a combustor 15 via a conventional compression fitting, such as a Swagelok® 17. As explained further below, the forward tip of the probe is seated in an aperture in the combustion liner 14, which is concentric with, and spaced radially inward from, the outer wall or casing 12. The dynamic pressure signal is transmitted through a passage in the holder to a sensor located within the holder but relatively remote from the forward tip, as described in further detail below. The pressure signal is damped in an acoustic damping system 19, also described further below.

Figure 2:
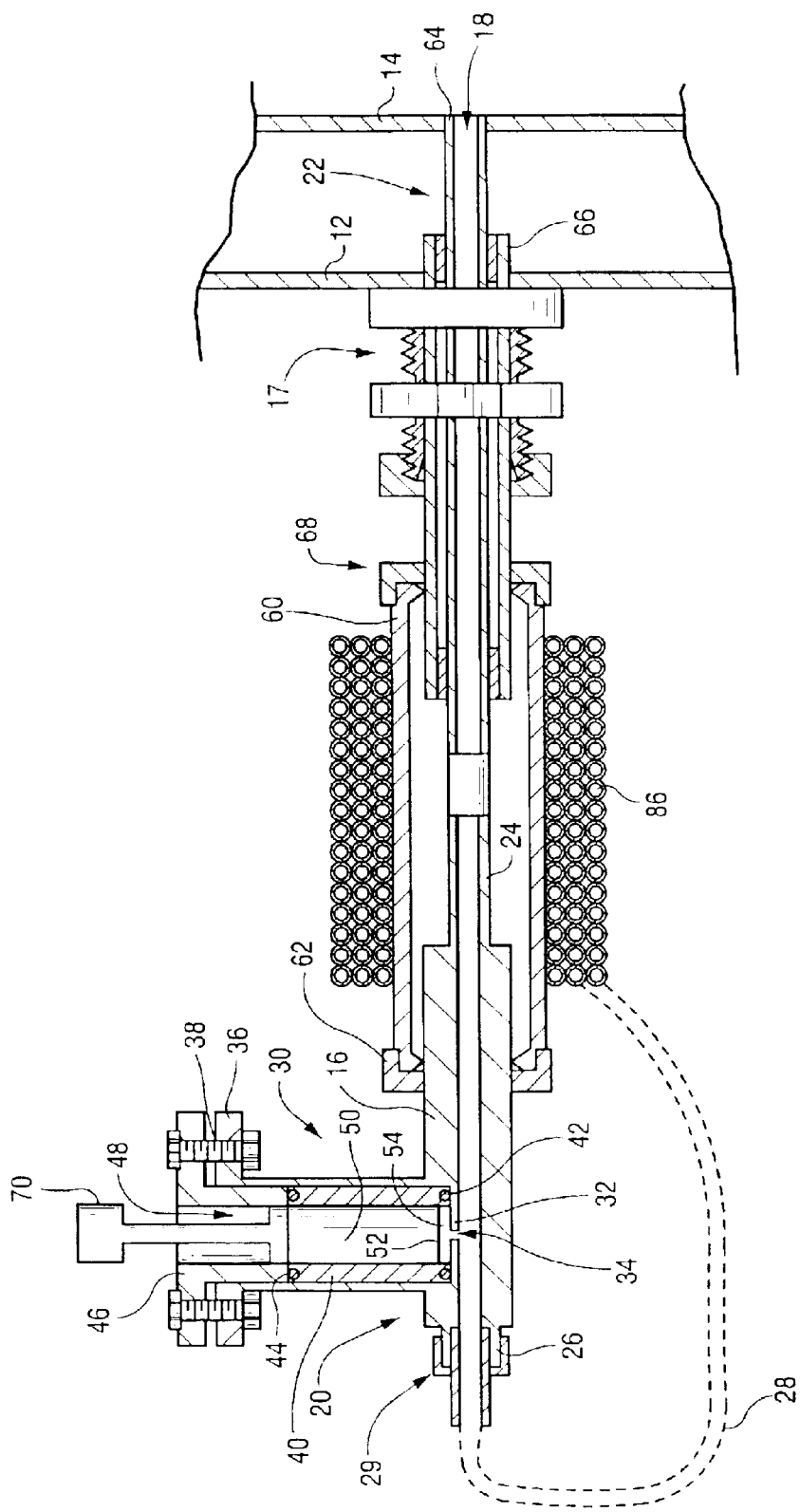
FIG. 2 is a schematic cross-section of the sensor holder of FIG. 1.

With reference to FIG. 2, which illustrates in greater detail a first embodiment of the invention, the probe holder includes a generally cylindrical or other suitably shaped holder body 16 formed with a first through-bore or wave guide passage 18 extending from a rearward end 20 to a forward end 22 of the holder body. The forward end 22 includes a reduced thickness forward extension 24 and the rearward end 20 includes a reduced thickness rearward extension 26. The forward end is adapted to project through an aperture in the combustor liner 14 so that the inlet to passage 18 is exposed to the combustor dynamic pressure. Passage 18 is counterbored in the rearward extension 26 to permit attachment (via a conventional compression fitting 29) of a metal tube or attenuation line 28 having an inside diameter equal to the inside diameter of bore 18, so that the inside diameter of the bore 18 and tube 28 is uniform throughout.

A sensor housing portion 30 of the holder body 16 is joined to (or is integral with) the holder body adjacent the rearward end 20, and extends perpendicular thereto. The housing portion 30 is formed with a cylindrical interior that extends into the wall of the body 16, such that only a relatively small thickness wall 32 separates the interior of the housing portion from the through bore or first passage 18, with a pressure feed hole or aperture 34 centrally located in the wall 32.

The outer end of the housing portion 30 includes a radial flange 36 with a plurality of screw holes 38 therein. Within the housing portion 30, a metal sleeve 40 is fitted such that the base of the sleeve 40 is seated on the bottom wall 32 of the housing portion 30. An O-ring 42 seals the sleeve relative to wall 32, and a second O-ring 44 at the opposite or outer end of the sleeve 40 seals the sleeve relative to a radial flange connector 46 of the sensor 48.

The inner or sensing portion 50 of the sensor 48 is received within the sleeve 40 with its innermost end, defined by diaphragm 52, spaced from bottom wall 32 of the housing portion 30, establishing a pressure chamber 54 between the diaphragm 52 and the wall 32. The sensor 48 also includes a cable connector 70 that extends out of the flange connector 46, and to which a cable (not shown) is attached, connecting the sensor with suitable monitoring and/or control apparatus. Reference is made in this regard to co-pending application Ser. No. 09/989,102, the entire disclosure of which is incorporated herein by this reference, and which discloses particulars of an exemplary sensor in greater detail.

In an embodiment of the invention, the dynamic pressure signal is transmitted from a high temperature environment such as in the inside of a combustion chamber via a wave guide passage to a damping coil. Thus, after the pressure signal passes the aperture 34 (having been exposed to diaphragm 52), it continues into the attenuation line 28 as shown in FIGS. 1 and 2. In order to prevent the formation of a standing wave at the probe holder/attenuation line interface, the internal diameter of the attenuation line 28 and the probe holder pressure signal (wave guide) passage 18 are identical, as mentioned above. Attenuation line 28 is connected in turn to damping coil 86.

To prevent the formation of condensate, the damping coil is in heat exchange relation with a heat source which may be dedicated heat source or an existing heated environment. Recognizing that the sensor holder itself is at an elevated temperature due to its communication with the combustor, in the illustrated embodiment, the damping coil 86 is wound around the horizontal axis of the pressure sensor holder, as schematically depicted in FIG. 2, so as to be disposed in heat exchange relation with the sensor holder. In the illustrated embodiment, the damping coil 86 is made of metal tubing with substantially the same internal diameter as the metal tubing comprising the attenuation line 28. Collectively the damping coil 86 on the probe holder and the attenuation line 28 may be referred to as a local mounted acoustic damping system.

As will be understood, by ensuring that the temperature inside the damping coil(s) is high enough to prevent condensation by disposing the damping coil in a heat exchange relation to a heat source, condensation is prevented from forming so that the system may work continuously. If deemed necessary, or desirable, to further prevent condensation, the end of the damping coil remote from its communication to the attenuation line may be in flow communication with a source of hot air to provide a continuous gentle purge of the system.

The alternative of providing passive continuous purge with hot air is schematically illustrated in FIG. 1. According to this option, a second bore or passage 72 is provided to extend from within the outer wall 12 of the combustor, such that its inlet is exposed to compressor discharge air in the radial space 84 between the outer wall 12 and liner 14, to an outlet bushing 76 generally aligned with the housing portion 30 and perpendicular to the passage 72. A tube 78 is secured within the outlet bushing 76 via e.g. a compression fitting and includes a bore that communicates with bore 72. This second axial bore or passage 72 is used to extract compressor discharge air from the radial space 84 and to supply the compressor discharge air to the top side of the wound damping coil 86 of the acoustic damping system. This hot compressor discharge air is used to provide a continuous passive purging of the horizontally wound damping coil 86 and thereby prevent formation of any condensate in the damping coil.

When the dynamic pressure signal leaves the source location and travels down in the inside of the metal tubing, it is gradually attenuated due to friction between the signal and the sidewalls of the tubing. The further down the tubing the signal travels, the more attenuation results. When the signal gets to the end of the tubing (including the damping coil) it is reflected and starts to travel back towards the signal source. Accordingly, the system is advantageously sized such that the distance from the measurement point (at 34) to the end of the acoustic damping system 28, 86 is sufficiently long to ensure that any reflected signal will be completely damped away before it can travel back to the measurement point. Also, in an exemplary embodiment, the distance from the measurement point to the dynamic pressure source is kept to an absolute minimum so that at the point of measurement, a minimum amount of damping has occurred.

In the illustrated embodiment, to accommodate the damping coil, the holder may be pre-formed to provide a coil winding segment. In the alternative, as schematically shown in FIG. 2, a coil holder may be detachably secured to, e.g., the body 16 of a holder of the type illustrated and disclosed in the '102 application. In this regard, winding the damping coil about the holder has the advantage that the heat exchange will reduce or minimize condensation. However, a length of tubing or a dedicated portion of the holder is required to accommodate the wound coil. In the embodiment illustrated in FIG. 2, a Tee holder of the type disclosed in copending application Ser. No. 09/989,102 has been modified to accommodate a coil holder. Thus, in this embodiment, a coil holder 60 defined as a tube is secured with a fitting 62 to the main body 16 of the probe holder and projects distally therefrom concentrically to the wave guide passage 18. A wave guide extension 64 is provided to extend the wave guide passage 18 to the liner wall 14. To support the coil holder tube 60 with respect to the wave guide extension, a support tube 66 is provided in spaced relation to the wave guide extension and secured, e.g., with a fitting 68 to the distal end of the coil holder tube 60.

As will be understood, FIG. 2 illustrates how a Tee holder of the type generally shown in the co-pending '102 application may be modified to provide for heat exchange to the damping coil 86. It is to be understood that rather than providing a retrofit configuration comprising a damping coil holder 60 and extensions 64 and 66, the probe holder body may be formed in the first instance to have a length and damping coil support portion to receive the damping coil thereto.

Figure 3:
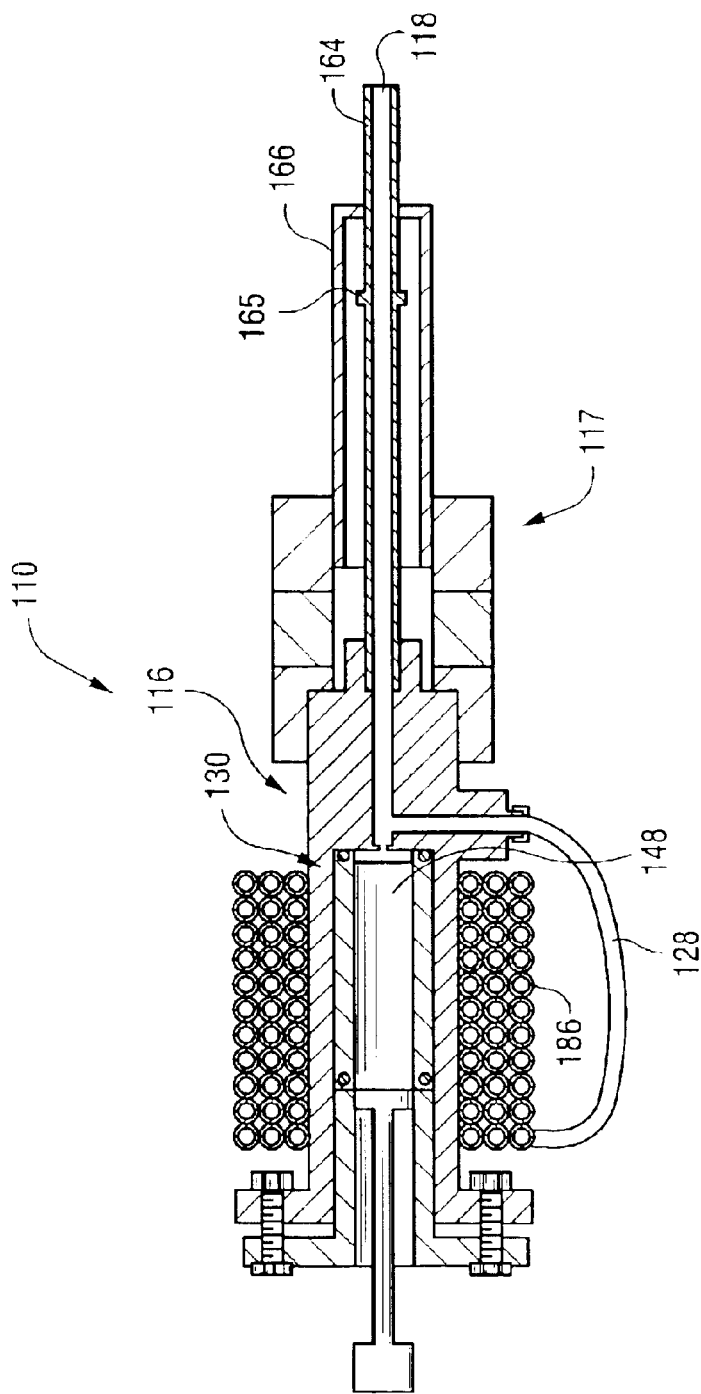
FIG. 3 is a schematic cross-section of a sensor holder according to a second embodiment of the invention.

A further, alternate embodiment of the invention is illustrated in FIG. 3. In this embodiment, the probe holder 110 has a straight configuration rather than a T-shaped configuration. Thus, in the FIG. 3 embodiment, the pressure sensor housing portion 130 is disposed coaxially with the axis of the wave guide 118 and the attenuation line 128 is defined to extend generally perpendicular with respect to the axis of the wave guide 118. A mounting tube 166, which extends through the casing wall (not shown) is coupled to the main body 116 of the probe holder 110 with e.g. a Swagelok® structure 117. A stop ring 165 may be mounted to the wave guide tubing 164 to insure that the probe tip does not go into the machine.

In the embodiment illustrated in FIG. 3, the damping coil 186 is wound about the housing portion 130 of the pressure sensor 148, which simplifies the configuration and allows the sensor 148 to be disposed at a minimal distance from the pressure source. It is to be appreciated, however, that the heat exchange effect of the pressure sensor itself may be less than provided by mounting the damping coil so as to be concentric to the wave guide 118, as in the embodiment of FIG. 2. Thus, as a further alternative (not illustrated) the coil may be disposed coaxially and concentrically to the wave guide 118 with the pressure sensor 148 disposed downstream from and axially aligned with the wave guide 118.

Figure 4:
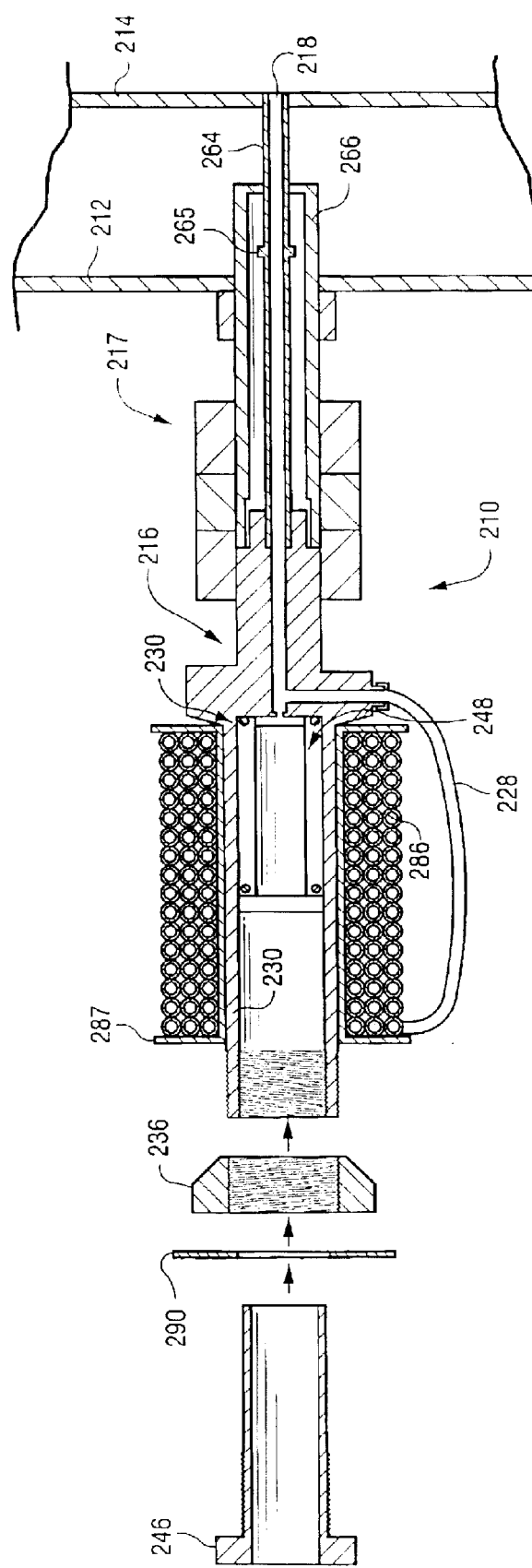
FIG. 4 is a schematic cross-section of a sensor holder according to a third embodiment of the invention.

Yet a further embodiment of the invention is illustrated in FIG. 4. As will be noted, this embodiment has a straight configuration similar to the FIG. 3 embodiment, so that the pressure sensor housing portion 230 is disposed coaxially with the axis of the wave guide 218 and the attenuation line 228 is defined to extend generally perpendicular to the axis of the wave guide 218. As in the FIG. 3 embodiment, in the FIG. 4 embodiment a mounting tube 266 extends through the casing wall 212 and the wave guide tube 264 terminates at the combustion liner 214. The mounting tube 266 is coupled to the main body 216 of the probe holder 210 with e.g. a Swagelok® structure 217. A stop ring 265 may be mounted to the wave guide tubing 264 to insure that the probe tip does not go into the machine.

In the embodiment illustrated in FIG. 4, the damping coil 286 is wound about the housing portion 230 of the pressure sensor 248. More specifically, the damping coil is wound on a metal spool 287 disposed coaxially to housing portion 230 and having radially projecting end walls to delimit the coil. To accommodate the spool and to simplify the assembly process, the outer end of the housing portion 230 includes an inner, e.g., left hand thread for engaging a complementary thread provided on end piece 246 and an outer, e.g., right hand thread for engaging a complementary thread provided in locking nut 236. A lock plate 290 is slidably disposed on end piece 246 to be locked between the flange of end piece 246 and lock nut 236. As will be understood, the end piece 246 and the lock nut 236 cooperatively lock to position and hold the sensor 248 in housing portion 230.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A dynamic pressure probe holder for a combustor comprising:
   a holder body having a pressure sensing passage and defining a pressure sensor chamber operatively coupled to said pressure sensing passage; and
   an elongated acoustic damping coil coupled to so as to be in flow communication with said pressure sensing passage, said damping coil being disposed in heat exchange relation to a heat source so as to substantially avoid condensation formation in said coil.

2. The probe holder of claim 1 wherein said holder body comprises said heat source and said damping coil is coaxially wound about said holder body.

3. The probe holder of claim 2 wherein said damping coil is co-axially wound to said pressure sensing passage.

4. The probe holder of claim 3 wherein said damping coil is wound about the holder body distally with respect to the pressure sensor.

5. The probe holder of claim 3 wherein said pressure sensor chamber is disposed in a housing portion disposed substantially perpendicular to said pressure sensing passage.

6. The probe holder of claim 5 wherein said damping coil is concentrically wound to said pressure sensing passage.

7. The probe holder of claim 3 wherein said pressure sensor is disposed in a housing portion disposed substantially coaxial to said pressure sensing passage.

8. The probe holder of claim 7 wherein said damping coil is coaxially wound to said housing portion.

9. The probe holder of claim 1 wherein said holder body is formed to define a compressor discharge air passage adapted for communication with a radial space in the combustor supplied with compressor discharge air.

10. The probe holder of claim 9 wherein a compressor discharge air tube is operatively coupled to said compressor discharge air passage and to a bore of said damping coil for conducting hot air to said damping coil interior.

11. The probe holder of claim 1 wherein an attenuation line is coaxially coupled to said holder body at a rearward end thereof, said attenuation line having a bore in communication with said pressure sensing passage and extending to said damping coil.

12. The probe holder of claim 11 wherein said pressure sensing passage and said bore of said attenuation line have substantially identical inner diameters.

13. The probe holder of claim 11 wherein said attenuation line is integral with said damping coil.

14. A dynamic pressure probe holder for a combustor comprising:
- a holder body having a pressure sensing passage and housing a pressure sensor operatively coupled to said pressure sensing passage; and
- an elongated acoustic damping coil coupled to so as to be in flow communication with said pressure sensing passage, said damping coil being disposed in heat exchange relation to a heat source so as to substantially avoid condensation formation in said coil. wherein an attenuation line is coupled to said holder body so as to extend perpendicularly therefrom, said attenuation line having a bore in communication with said pressure sensing passage and extending to said damping coil.

15. The probe holder of claim 14 wherein said holder body comprises heat source and said damping coil is coaxially wound about said holder body.

16. The probe holder of claim 15 wherein said damping coil is coaxially wound to said pressure sensing passage.

17. The probe holder of claim 15 wherein said pressure chamber is disposed in a housing portion disposed substantially coaxial to said pressure sensing passage.

18. The probe holder of claim 17 wherein said damping coil is coaxially wound to said housing portion.

19. A dynamic pressure probe holder for a combustor comprising:
- a holder body having a pressure sensing passage and defining a pressure sensor chamber operatively coupled to said pressure sensing passage; and
- an elongated acoustic damping coil having a bore operatively coupled to said pressure sensing passage, said damping coil being wound about said holder body so as to be disposed in heat exchange relation thereto so as to substantially avoid condensation formation in said coil.

20. The probe holder of claim 19 wherein said damping coil is co-axially wound to said pressure sensing passage.

21. The probe holder of claim 19 wherein said pressure sensor is disposed substantially perpendicular to said pressure sensing passage.

22. The probe holder of claim 19 wherein said pressure chamber is disposed substantially coaxial to said pressure sensing passage.

23. The probe holder of claim 19 wherein an attenuation line is coaxially coupled to said holder body and extends from said pressure sensing passage to said damping coil.

24. The probe holder of claim 23 wherein a second passage is formed in said holder body, for communicating compressor discharge air with a bore of said damping coil at the end thereof remote from said attenuation line.

25. A method of obtaining a dynamic pressure signal from a combustor while preventing the formation of condensation, comprising:
- providing a dynamic pressure probe device comprising: a holder body having a pressure sensing passage and defining a pressure sensor chamber operatively coupled to said pressure sensing passage; and an elongated damping coil coupled to said pressure sensing passage, said damping coil being disposed in heat exchange relation to a heat source;
- supplying a dynamic pressure signal from the combustor through said pressure sensing passage;
- detecting said dynamic pressure signal with a pressure sensor in communication with said pressure sensor chamber ; and
- transmitting said pressure signal downstream from said pressure sensor to an acoustic damping system comprising said coil; whereby heat from said heat source prevents the formation of condensation in said coil.

26. The method of claim 25 wherein said holder body comprises said heat source and said damping coil is wound about said holder body so as to be in heat exchange relation therewith.

27. The method of claim 26 further comprising supplying compressor discharge air to said damping coil to provide a passive purging of the damping coil and thereby prevent formation of any condensate in the damping coil.

28. The method of claim 27 wherein said supplying step is carried out by providing a second passage in said holder body with an inlet exposed to compressor discharge air in a radial space between an outer wall and a liner of said combustor.

* * * * *

UNITED STATES PATENT AND TRADEMARK OFFICE
CERTIFICATE OF CORRECTION

PATENT NO. : 6,978,680 B2
DATED : December 27, 2005
INVENTOR(S) : Gleeson et al.

It is certified that error appears in the above-identified patent and that said Letters Patent is hereby corrected as shown below:

<u>Column 7,</u>
Line 16, insert -- said -- between "comprises" and "heat".
Line 20, delete "claim 15" and insert -- claim 14 --.
Line 21, delete "chamber" and insert -- sensor --.
Line 38, delete "sensor" and insert -- chamber --.

<u>Column 8,</u>
Line 7, delete "the end" and insert -- an end --.
Line 24, insert -- chamber -- between "pressure sensor" and "to".

Signed and Sealed this

Eleventh Day of April, 2006

JON W. DUDAS
*Director of the United States Patent and Trademark Office*